United States Patent
Kim et al.

(10) Patent No.: US 8,824,584 B2
(45) Date of Patent: *Sep. 2, 2014

(54) METHOD FOR TRANSMITTING SOUNDING REFERENCE SIGNAL IN MIMO WIRELESS COMMUNICATION SYSTEM AND APPARATUS THEREFOR

(75) Inventors: Bong Hoe Kim, Anyang-si (KR); Byeong Woo Kang, Anyang-si (KR); Yu Jin Noh, Anyang-si (KR); Hak Seong Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 574 days.

This patent is subject to a terminal disclaimer.

(21) Appl. No.: 12/711,185

(22) Filed: Feb. 23, 2010

(65) Prior Publication Data

US 2010/0215114 A1 Aug. 26, 2010

Related U.S. Application Data

(60) Provisional application No. 61/155,143, filed on Feb. 24, 2009, provisional application No. 61/157,163, filed on Mar. 3, 2009.

(30) Foreign Application Priority Data

Feb. 11, 2010 (KR) ........................ 10-2010-0012865

(51) Int. Cl.
*H04B 7/02* (2006.01)

(52) U.S. Cl.
USPC ........... 375/267; 375/260; 375/299; 375/347; 375/349; 375/346

(58) Field of Classification Search
USPC .................. 375/267, 260, 299, 347, 349, 346
See application file for complete search history.

(56) References Cited

U.S. PATENT DOCUMENTS

| 2009/0042615 A1* | 2/2009 | Teo et al. .................... 455/562.1 |
| 2009/0238241 A1* | 9/2009 | Hooli et al. .................... 375/133 |
| 2009/0239476 A1* | 9/2009 | Womack et al. ................ 455/68 |
| 2009/0279447 A1* | 11/2009 | Mehta et al. .................. 370/252 |

\* cited by examiner

*Primary Examiner* — Kabir A Timory
(74) *Attorney, Agent, or Firm* — Mckenna Long & Aldridge LLP

(57) ABSTRACT

A method for transmitting a sounding reference signal in a MIMO wireless communication system and an apparatus therefor are disclosed. The method for transmitting sounding reference signals (SRSs) in a MIMO wireless communication system comprises receiving sounding reference signal parameters from a base station; receiving information of the number of sounding reference signals which will be transmitted at a transmission time instant from the base station; if a plurality of sounding reference signals are provided, generating the sounding reference signals corresponding to each of the plurality of antennas by using the sounding reference signal parameters; and transmitting the generated sounding reference signals to the base station through their corresponding antennas at a specific transmission instant.

8 Claims, 11 Drawing Sheets

--Prior Art--

(a) Control - plane protocol stack (b) User - plane protocol stack

METHOD FOR TRANSMITTING SOUNDING REFERENCE SIGNAL IN MIMO WIRELESS COMMUNICATION SYSTEM AND APPARATUS THEREFOR

This application claims the benefit of the U.S. Provisional Patent Applications 61/155,143, filed on Feb. 24, 2009, 61/157,163, filed on Mar. 3, 2009, and the Korean Patent Application 10-2010-0012865, filed on Feb. 11, 2010, which are hereby incorporated by references as if fully set forth herein.

BACKGROUND OF THE INVENTION

1. Field of the Invention

The present invention relates to a wireless communication system, and more particularly, to a method for transmitting a sounding reference signal in a MIMO wireless communication system and an apparatus therefor.

2. Discussion of the Related Art

FIG. 1 is a schematic view illustrating a general MIMO communication system. Multiple-Input Multiple-Output (MIMO) means a scheme that a plurality of transmitting antennas and a plurality of receiving antennas are used. Transmission and reception efficiency can be improved by the MIMO scheme. Namely, a transmitter or receiver of a wireless communication system can enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay station. According to the MIMO antenna technology, it is possible to overcome limitation of a transmission rate in mobile communication according to the related art where a single antenna is used.

A schematic view of a general MIMO communication system is illustrated in FIG. 1. Referring to FIG. 1, $N_T$ number of transmitting antennas are provided at a transmitter while $N_R$ number of receiving antennas are provided at a receiver. If a plurality of antennas are used at both the transmitter and the receiver, theoretical channel transmission capacity is more increased than that a plurality of antennas are used at any one of the transmitter and the receiver. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used can be increased theoretically as expressed by the following Equation 1 as much as a value obtained by multiplying a maximum transmission rate $R_O$ by a rate increase $R_i$. In this case, $R_i$ corresponds to a smaller value of $N_T$ and $N_R$.

$$R_i = \min(N_T, N_R) \quad \text{[Equation 1]}$$

For example, in a MIMO communication system that uses four transmitting antennas and four receiving antennas, a transmission rate four times greater than that of a single antenna system can be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As illustrated in FIG. 1, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information can be expressed by a vector shown in Equation 2 as follows.

$$s = [s_1, s_2, \ldots, s_{N_T}]^T \quad \text{[Equation 2]}$$

Meanwhile, different kinds of transmission power can be applied to each of the transmission information $s_1, s_2, \ldots, s_{N_T}$. At this time, supposing that each transmission power is $P_1, P_2, \ldots, P_{N_T}$, transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ can be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel status. Such transmitting signals $x_1, x_2, \ldots, x_{N_T}$ can be expressed by Equation 5 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

Meanwhile, in a spatial multiplexing scheme, each of transmission information $s_1, s_2, \ldots, s_{N_T}$ has different kinds of values. On the other hand, in a transmission diversity scheme, each of transmission information $s_1, s_2, \ldots, s_{N_T}$ has the same value. Examples of a general transmission diversity scheme include a space time block coding (STBC) scheme, a space frequency block coding (SFBC) scheme, and a cyclic delay diversity (CDD) scheme.

Meanwhile, in order to acquire diversity gain, channel measurement is necessarily required. Accordingly, for channel measurement for each of transmission paths through which diversity transmission is performed, sounding reference signals (SRSs) transmitted to each of the transmission paths are required. If a user equipment has two transmitting antennas, diversity can be acquired through channel measurement for transmission of two sounding reference signals. However, if a user equipment transmits sounding reference signals at the same power as that signals are transmitted through two transmitting antennas but has four transmitting antennas, the transmission power of the sounding reference signals is reduced to half, whereby channel measurement may be incorrect. Accordingly, in the case that the number of antennas increases under the state that the transmission power of the user equipment is limited, diversity gain is certainly overflowed at a certain range.

Hereinafter, in order that a user equipment having a plurality of antennas effectively transmits an uplink signal, a method for signaling after selecting a transmitting antenna of a user equipment at a base station and a method for transmitting a sounding reference signal from a user equipment to allow a base station to select an antenna will be suggested.

SUMMARY OF THE INVENTION

Accordingly, the present invention is directed to a method for transmitting a sounding reference signal in a MIMO wireless communication system and an apparatus therefor, which substantially obviate one or more problems due to limitations and disadvantages of the related art.

An object of the present invention is to provide a method for transmitting a sounding reference signal in a MIMO wireless communication system and an apparatus therefor based on the aforementioned discussion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting sounding reference signals (SRSs) in a MIMO wireless communication system comprises receiving sounding reference signal parameters from a base station; receiving information of the number of sounding reference signals which will be transmitted at a transmission time instant from the base station; if a plurality of sounding reference signals are provided, generating the sounding reference signals corresponding to each of the plurality of antennas by using the sounding reference signal parameters; and transmitting the generated sounding reference signals to the base station through their corresponding antennas at a specific transmission instant.

In this case, if the number of antennas which will transmit the sounding reference signals is two, the step of generating sounding reference signals includes generating a first sounding reference signal by using the sounding reference signal parameters as they are; and generating a second sounding reference signal by changing at least one of the sounding reference signal parameters.

Also, the sounding reference signal parameters include a transmissionComb value or a cyclic shift value.

If the number of antennas which will transmit the sounding reference signals is three, the step of generating sounding reference signals includes generating a first sounding reference signal by using the sounding reference signal parameters as they are; generating a second sounding reference signal by changing the transmissionComb value of the sounding reference signal parameters; and generating a third sounding reference signal by changing the cyclic shift value of the sounding reference signal parameters.

Also, if the number of antennas which will transmit the sounding reference signals is three, the step of generating sounding reference signals includes generating a first sounding reference signal by using the sounding reference signal parameters as they are; and generating a second sounding reference signal and a third sounding reference signal by changing the cyclic shift value of the sounding reference signal parameters. Preferably, the cyclic shift values of the first sounding reference signal to the third sounding reference signal are different from one another.

More preferably, the method further comprises transmitting the generated sounding reference signals to the base station through another antenna at next transmission instant, the another antenna being different from the antennas transmitted the specific transmission instant.

In another aspect of the present invention; a user equipment having multiple antennas comprises a receiving module receiving information of the number of sounding reference signals, which will be transmitted at a transmission time instant, and sounding reference signal parameters from a base station; a processing module, if a plurality of sounding reference signals are provided, generating the sounding reference signals corresponding to each of the plurality of antennas by using the sounding reference signal parameters; and a transmitting module transmitting the generated sounding reference signals to the base station through the corresponding antennas at a specific transmission instant.

In this case, if the number of antennas which will transmit the sounding reference signals is two, the processing module generates a first sounding reference signal by using the sounding reference signal parameters as they are, and generates a second sounding reference signal by changing at least one of the sounding reference signal parameters.

Also, the sounding reference signal parameters include a transmissionComb value or a cyclic shift value.

Preferably, if the number of antennas which will transmit the sounding reference signals is three, the processing module generates a first sounding reference signal by using the sounding reference signal parameters as they are, generates a second sounding reference signal by changing the transmissionComb value of the sounding reference signal parameters, and generates a third sounding reference signal by changing the cyclic shift value of the sounding reference signal parameters.

Also, if the number of antennas which will transmit the sounding reference signals is three, the processing module generates a first sounding reference signal by using the sounding reference signal parameters as they are, and generates a second sounding reference signal and a third sounding reference signal by changing the cyclic shift value of the sounding reference signal parameters. Preferably, the cyclic shift values of the first sounding reference signal to the third sounding reference signal are different from one another.

More preferably, the transmitting module transmits the generated sounding reference signals to the base station through another antenna at next transmission instant, the another antenna being different from the antennas transmitted the specific transmission instant.

According to the embodiment of the present invention, the user equipment can effectively transmit the sounding reference signals in the MIMO wireless communication system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Herein, a 3GPP LTE (Release-8) system will be referred to as an LTE system or a legacy system. Also, a user equipment that supports the LTE system will be referred to as an LTE user equipment or a legacy user equipment. A 3GPP LTE-A (Release-10) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary, and the embodiment of the present invention may easily be applied to H-FDD mode or TDD mode through modifications.

Figure 1:
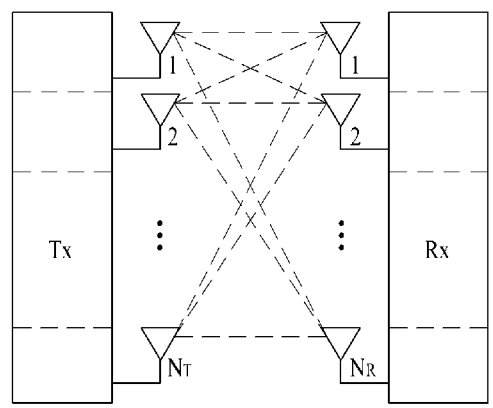
FIG. 1 is a schematic view illustrating a general MIMO communication system.
Figure 2:
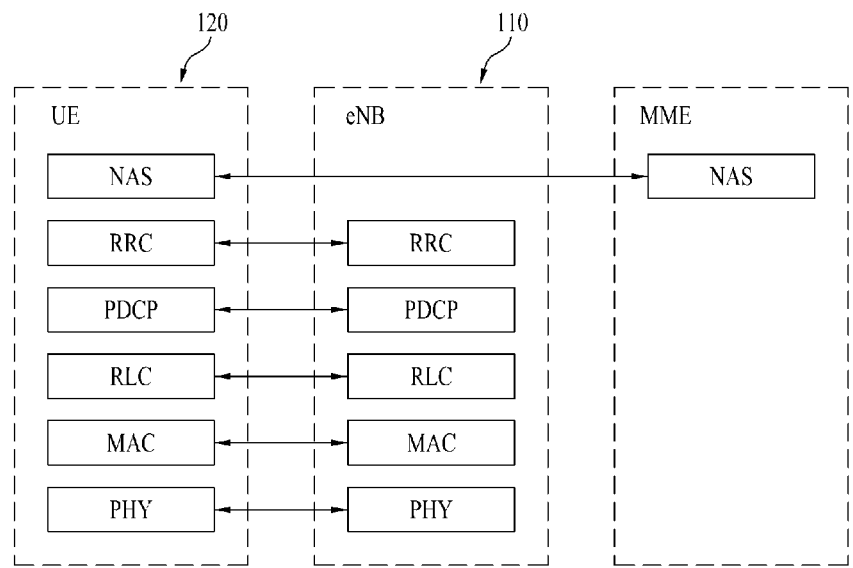
FIG. 2 is a diagram illustrating structures of a control plane and a user plane of a radio interface protocol between one user equipment and E-UTRAN based on the 3GPP radio access network standard.
Figure 2:
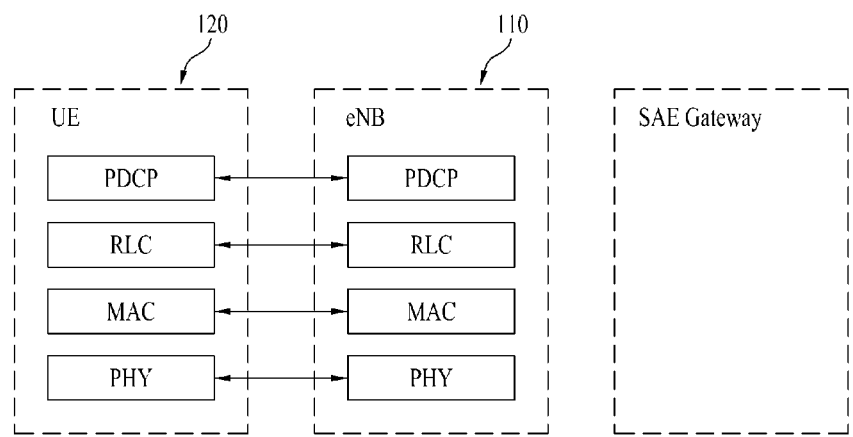

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

The physical layer as the first layer provides an information transfer service to an upper layer using a physical channel. The physical layer (PHY) is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB is established at one of bandwidths of 1.25, 2.5, 5, 10, 15, and 20 Mhz and provides a downlink or uplink transmission service to several user equipments. At this time, different cells can be configured provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
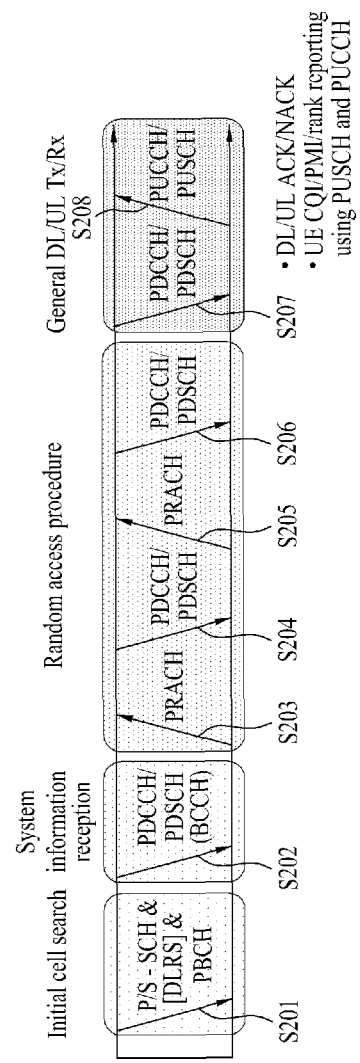
FIG. 3 is a diagram illustrating physical channels used in a 3GPP system and a method for transmitting a general signal using the physical channel.

FIG. 3 is a diagram illustrating physical channels used in a 3GPP system and a method for transmitting a general signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a random physical random access channel (PRACH) (S303 and S305), and receives a response message to the preamble through the PDCCH and a PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as general a procedure of transmitting uplink/downlink signals. The control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

Figure 4:
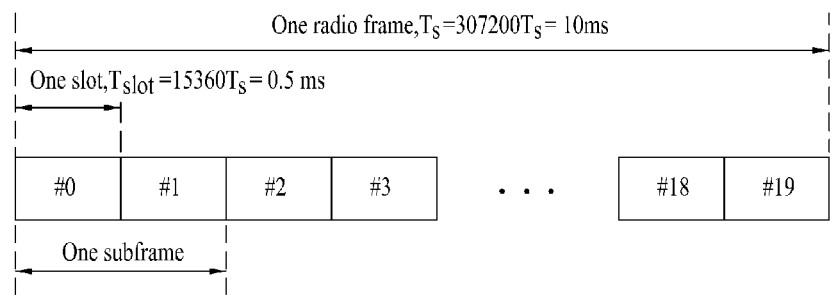
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \cdot T_s$) and includes 10 subframes of an equal size. Each sub frame has a length of 1 ms and includes two slots. Each slot has a length of 0.5 ms ($15360 \cdot T_s$). In this case, $T_s$ represents a sampling time, and is expressed by $T_s=1/(15 \text{ kHz} \times 2048)=3.2552 \times 10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
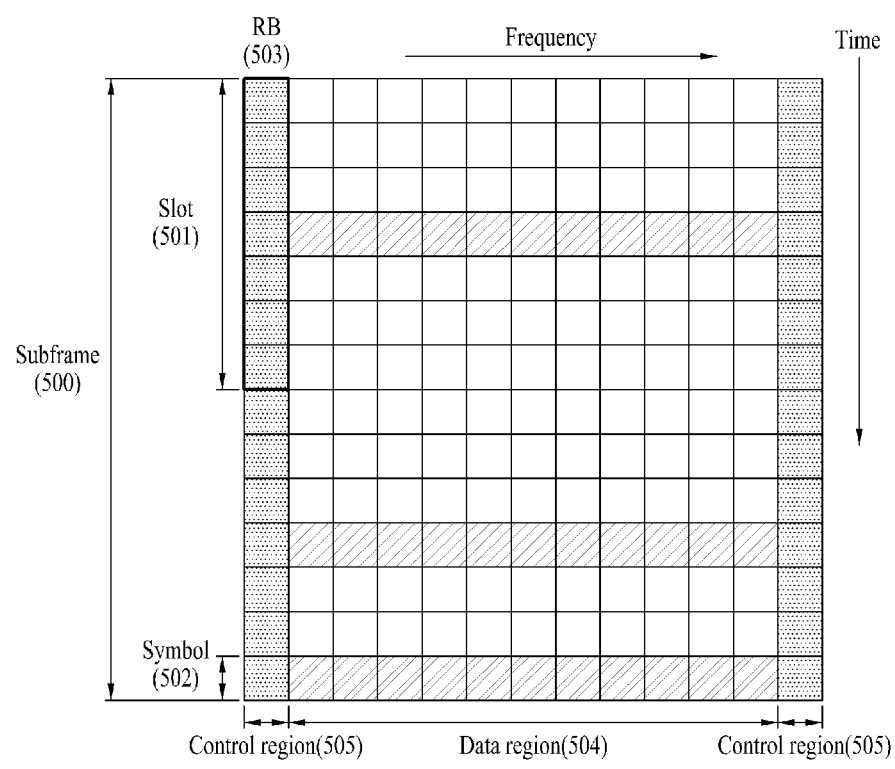
FIG. 5 is a diagram illustrating a structure of an uplink subframe used in an LTE system.

FIG. 5 is a diagram illustrating a structure of an uplink subframe used in an LTE system.

Referring to FIG. 5, a subframe 500 having a length of 1 ms, which is a basic unit of LTE uplink transmission, includes two slots 501 of 0.5 ms. In case of normal cyclic prefix (CP) length, each slot includes seven symbols 502, each of which corresponds to each SC-FDMA symbol. A resource block (RB) 503 is a resource allocation unit corresponding to twelve (12) subcarriers in a frequency domain and one slot in a time domain. A structure of an LTE uplink subframe is classified into a data region 504 and a control region 505. In this case, the data region means a series of communication resources used for transmission of data such as voice and packet transmitted to each user equipment, and corresponds to the other resources except for the control region within the subframe. The control region means a series of communication resources used for transmission of downlink channel quality report, ACK/NACK of a downlink signal, and uplink scheduling request from each user equipment.

As illustrated in FIG. 5, the time when a sounding reference signal can be transmitted within one subframe is a duration where SC-FDMA symbol at the last location on a time axis of one subframe exists, and the sounding reference signal is transmitted through a data transmission band on a frequency axis. Sounding reference signals of several user equipments, which are transmitted to the last SC-FDMA of the same subframe, can be identified depending on the frequency location.

The present invention suggests a transmission diversity scheme that a user equipment having a plurality of transmitting antennas transmits an uplink signal through a part of the antennas to acquire diversity gain. In more detail, the transmission diversity scheme of the present invention means a scheme for selecting transmitting antennas by forming a receiver, i.e., base station and a closed loop.

Figure 6:
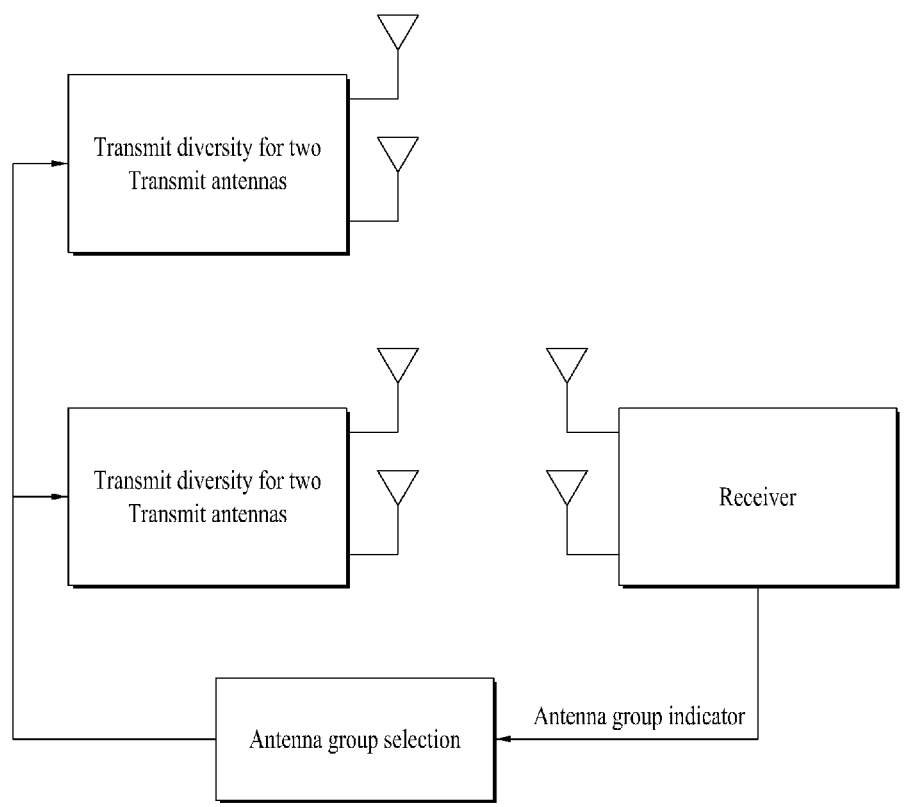
FIG. 6 is a conceptional view illustrating a system that performs a scheme for selecting transmitting antennas according to the embodiment of the present invention.

FIG. 6 is a conceptional view illustrating a system that performs a scheme for selecting transmitting antennas according to the embodiment of the present invention.

Referring to FIG. 6, a transmitter, i.e., user equipment selects a part of a plurality of transmitting antennas through indication of a base station. Hereinafter, for convenience of description, it is assumed that a user equipment has four antennas, which will be referred to as first to fourth antennas, respectively.

If two antennas are selected, a total of six combinations of antennas, such as (#1, #2), (#1, #3), (#1, #4), (#2, #3), (#2, #4), and (#3, #4), can be made. In this case, #1, #2, #3 and #4 mean first to fourth antennas, respectively.

The simplest method for indicating such combination of antennas from the base station to the user equipment is to perform signaling using 3-bit information so as to indicate all the six combinations of antennas. The 3-bit information can be transmitted dynamically through a Physical Dedicated Control Channel (PDCCH) or be indicated semi-statically from a upper layer, such as a RRC layer. Further, the 3-bit information can be signaled by a hybrid method, such as a combination of the dynamic method and the semi-static method.

Meanwhile, a method for performing signaling for antenna combination sets at a base station through an upper layer may be considered. In this case, the antenna combination sets are not overlapped with one another. However, this method is based on that the user equipment can know a specific antenna combination having the best throughput. For example, the base station performs signaling for three antenna combination sets such as {(#1, #2), (#3, #4)}, {(#1, #3), (#2, #4)} and {(#1, #4), (#2, #3)} to the user equipment, and the user equipment transmits an uplink signal by selecting a specific antenna combination having the best throughput from the signaled antenna combination sets. In this case, the base station can perform signaling for the antenna combination sets using 2-bit information.

Furthermore, a method for performing signaling for a specific antenna combination using 1-bit information may be considered. In this case, the 1-bit information can be transmitted implicitly through a control channel. In more detail, the 1-bit information may be added as a mask during a CRC prefix process. In other words, if different CRC masks are applied to combinations of transmitting antennas, the 1-bit information can be transmitted implicitly.

Finally, considering throughput degradation, it may be considered that the antenna combination that can be transmitted from the user equipment is fixed to {(#1, #2), (#3, #4)}. In this case, no signaling is required.

As described above, in order that the base station selects the antenna combination of the user equipment, channel measurement is necessarily required. In this case, the user equipment may transmit a sounding reference signal to only one antenna at a specific transmission instant without considering antenna combination, or may transmit a sounding reference signal to all antennas at a specific transmission instant. Also, it may be considered that the user equipment transmit a sounding reference signal using antenna combination (#1, #2) at a specific transmission instant and transmits the sounding reference signal using antenna combination (#3, #4) at next transmission instant.

Meanwhile, the number of sounding reference signals transmitted from the user equipment is preferably signaled by the base station. If the user equipment transmits a plurality of sounding reference signals at a specific transmission instant, it may matter how the respective sounding reference signals can be identified from one another for transmission. Prior to solutions of the matter, a method for generating sounding reference signals and sounding reference signal parameters disclosed in the LTE standard document will be described.

The sounding reference signal includes a constant amplitude zero auto correlation (CAZAC) sequence. The sounding reference signals transmitted from a plurality of user equipments are CAZAC sequences $r^{SRS}(n)=r_{u,v}^{(\alpha)}(n)$ having different cyclic shift values $\alpha$ according to the following Equation 6.

$$\alpha = 2\pi \frac{n_{SRS}^{cs}}{8} \quad \text{[Equation 6]}$$

In the Equation 6, $n_{SRS}^{cs}$ is a value set for each user equipment by the upper layer, and has an integer value between 0 and 7.

The CAZAC sequences generated from one CAZAC sequence through cyclic shift are characterized in that they have a zero-correlation value with the sequences having different cyclic shift values. The sounding reference signals of the same frequency domain can be identified from one another depending on the CAZAC sequence cyclic shift value by using the above characteristic. The sounding reference signal of each user equipment is allocated on the frequency depending on a parameter set by the base station. The user equipment performs frequency hopping of the sounding reference signal to transmit the sounding reference signal to all of uplink data transmission bandwidths.

Hereinafter, a detailed method for mapping a physical resource for transmitting a sounding reference signal in an LTE system will be described.

After being multiplied by an amplitude scaling parameter $\beta_{SRS}$ to satisfy the transmission power $P_{SRS}$, the sounding reference signal sequence $r^{SRS}(n)$ is mapped into a resource element (RE) having an index of (k, l) from $r^{SRS}(0)$ by the following Equation 7.

$$a_{2k+k_0,l} = \begin{cases} \beta_{SRS} r^{SRS}(k) & k=0, 1, \ldots, M_{sc,b}^{RS}-1 \\ 0 & \text{otherwise} \end{cases} \quad \text{[Equation 7]}$$

In the Equation 7, $k_0$ denotes a frequency domain start point of the sounding reference signal, and $M_{sc,b}^{RS}$ is a length, i.e., bandwidth, of a sounding reference signal sequence, which is expressed in a unit of subcarrier defined as expressed by the following Equation 8.

$$M_{sc,b}^{RS} = m_{SRS,b} N_{sc}^{RB}/2 \quad \text{[Equation 8]}$$

In the Equation 8, $m_{SRS,b}$ is a value signaled from the base station depending on an uplink bandwidth $N_{RB}^{UL}$ as illustrated in the following Table 1 to Table 4.

In order to acquire $m_{SRS,b}$, a cell specific parameter $C_{SRS}$ having an integer value between 0 and 7 and a user equipment specific parameter $B_{SRS}$ having an integer value between 0 and 3 are required. These values $C_{SRS}$ and $B_{SRS}$ are given by the upper layer.

TABLE 1

$b_{hop} = 0, 1, 2, 3$, values for the uplink bandwidth of $6 \leq N_{RB}^{UL} \leq 40$.

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$, values for the uplink bandwidth of $40 < N_{RB}^{UL} \leq 60$.

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |

TABLE 2-continued $b_{hop} = 0, 1, 2, 3$, values for the uplink bandwidth of $40 < N_{RB}^{UL} \leq 60$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$, values for the uplink bandwidth of $60 < N_{RB}^{UL} \leq 80$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$, values for the uplink bandwidth of $80 < N_{RB}^{UL} \leq 110$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

$k_0$ indicating the frequency domain start point of the sounding reference signal is determined by the following Equation 9.

$$k_0 = k_0' + \sum_{b=0}^{B_{SRS}} 2M_{sc,b}^{RS} n_b \quad \text{[Equation 9]}$$

In the Equation 9, $k'_0$ is determined in a general uplink subframe by the following Equation 10 and in an uplink pilot timeslot (UpPTS) by the following Equation 11.

$$k_0' = (\lfloor N_{RB}^{UL}/2 \rfloor - m_{SRS,0}/2)N_{SC}^{RB} + k_{TC} \quad \text{[Equation 10]}$$

$$k_0' = \begin{cases} (N_{RB}^{UL} - m_{SRS,0}^{max})N_{sc}^{RB} + k_{TC} & \text{if } ((n_f \bmod 2) \times (2 - N_{SP}) + t_{RA}^1) \bmod 2 = 0 \\ k_{TC} & \text{otherwise} \end{cases} \quad \text{[Equation 11]}$$

In the Equation 10 and the Equation 11, $k_{TC}$ is a transmissionComb parameter provided by the upper layer and has a value of 0 or 1. Also, $n_b$ denotes a frequency location index.

The user equipment can perform frequency hopping of the sounding reference signal to transmit the sounding reference signal to all the uplink data transmission bandwidths. The frequency hopping is set by a parameter $b_{hop}$ having a value of 0 to 3 given by the upper layer.

If frequency hopping of the sounding reference signal is not activated, i.e., in case of $b_{hop} \geq B_{SRS}$, the frequency location index $n_b$ has a constant value as expressed by the following Equation 12. In the Equation 12, $n_{RRC}$ is a parameter given by the upper layer.

$$n_b = \lfloor 4n_{RRC}/m_{SRS,b} \rfloor \bmod N_b \quad \text{[Equation 12]}$$

Meanwhile, if frequency hopping of the sounding reference signal is activated, i.e., in case of $b_{hop} < B_{SRS}$, the frequency location index $n_b$ is defined by the following Equations 13 and 14.

$$n_b = \begin{cases} \lfloor 4n_{RRC}/m_{SRS,b} \rfloor \bmod N_b & b \leq b_{hop} \\ \{F_b(r_{SRS}) + \lfloor 4n_{RRC}/m_{SRS,b} \rfloor\} \bmod N_b & \text{otherwise} \end{cases} \quad \text{[Equation 13]}$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Equation 14]}$$

In the Equation 15, $n_{SRS}$ is a parameter that calculates the number of transmission times of the sounding reference signal and is defined by the following Equation 15.

$$n_{SRS} = \begin{cases} 2N_{SP} n_f + 2(N_{SP} - 1)\lfloor \frac{n_s}{10} \rfloor + \lfloor \frac{T_{offset}}{T_{offset\_max}} \rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases} \quad \text{[Equation 15]}$$

In the Equation 15, $T_{SRS}$ is a period of the sounding reference signal, and $T_{offset}$ denotes subframe offset of the sounding reference signal. Also, $n_s$ denotes a slot number, and $n_f$ denotes a frame number.

A user equipment specific sounding reference signal setup index $I_{SRS}$ for setting the period $T_{SRS}$ of the sounding reference signal and the subframe offset $T_{offset}$ is expressed as illustrated in the following Table 5 and Table 6 depending on FDD and TDD.

TABLE 5

UE Specific SRS Periodicity $T_{SRS}$ and Subframe Offset Configuration $T_{offset}$, FDD.

| SRS Configuration Index $I_{SRS}$ | SRS Periodicity $T_{SRS}$ (ms) | SRS Subframe Offset $T_{offset}$ |
| --- | --- | --- |
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | Reserved | reserved |

TABLE 6

UE Specific SRS Periodicity $T_{SRS}$ and Subframe Offset Configuration $T_{offset}$, TDD.

| Configuration Index $I_{SRS}$ | SRS Periodicity $T_{SRS}$ (ms) | SRS Subframe Offset $T_{offset}$ |
| --- | --- | --- |
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | Reserved | reserved |

The present invention suggests that the number of antennas that will transmit a sounding reference signal from the user equipment at a specific transmission instant is added to a signaling field (for example, $N_{SRS}$). The following Table 7 illustrates the number of actual transmitting antennas according to $N_{SRS}$ when the number of transmitting antennas of the user equipment is four. It will be apparent to the person with ordinary skill in the art to which the present invention pertains that $N_{SRS}$ can be set similarly to Table 7 even in the case that the number of transmitting antennas of the user equipment is not four.

TABLE 7

| Nsrs | Number of antennas (or antenna ports) transmitting SRS |
| --- | --- |
| 0(=00) | 1 |
| 1(=01) | 2 |
| 2(=10) | 3 |
| 3(=11) | 4 |

Also, if the user equipment transmits a plurality of sounding reference signals at a specific transmission instant, it is preferable that the user equipment uses user equipment specific parameters to identify the sounding reference signals from one another. Among the user equipment specific parameters, since srsBandwidth, srsHoppingBandwidth, frequencyDomainPosition and srs-ConfigurationIndex as described above are commonly applied to all the transmitting antennas of the user equipment, they are not suitable to identify the sounding reference signals transmitted from the respective antennas. Accordingly, the present invention suggests that the sounding reference signals transmitted from the respective antennas are identified from one another using the transmissionComb parameter of the Equation 10 and the Equation 11 and the cyclic shift value α of the Equation 6. Hereinafter, a method for transmitting sounding reference signals by identifying them from one another at a user equipment depending on a value $N_{SRS}$ signaled from a base station will be described in detail with reference to the accompanying drawings.

Figure 7:
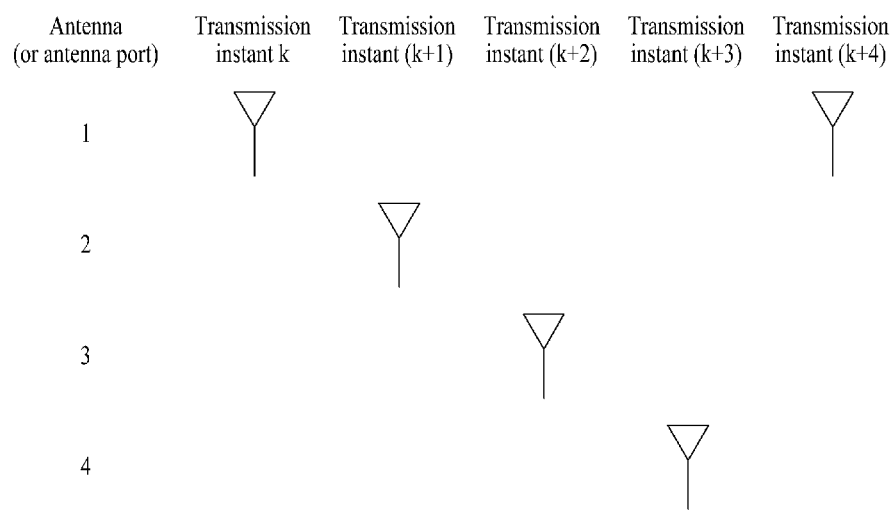
FIG. 7 is a diagram illustrating a method for transmitting sounding reference signals from a user equipment through one antenna per transmission instant in accordance with the embodiment of the present invention.

FIG. 7 is a diagram illustrating a method for transmitting sounding reference signals from a user equipment through one antenna per transmission instant in accordance with the embodiment of the present invention.

Referring to FIG. 7, if the base station signals the value $N_{SRS}$ to 0, the user equipment transmits the sounding reference signals through one antenna per transmission instant. The user equipment uses a sounding reference signal parameter as the value signaled by the upper layer. However, the user equipment changes the antenna that transmits the sounding reference signals per transmission instant as illustrated in FIG. 7. For example, if the user equipment transmits a sounding reference signal through a first antenna at the kth transmission instant, the user equipment transmits the sounding reference signals through a second antenna at the k+1th transmission instant, through a third antenna at the k+2th transmission instant, and through a fourth antenna at the k+3th transmission instant. Accordingly, as the transmission instant of four times passes, transmission of the sounding reference signals can be completed through all the antennas.

Figure 8:
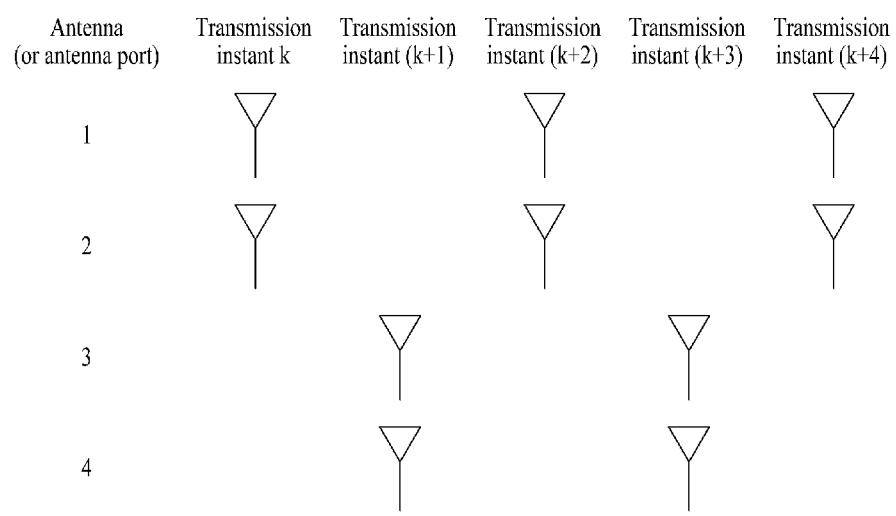
FIG. 8 is a diagram illustrating a method for transmitting sounding reference signals from a user equipment through two antennas per transmission instant in accordance with the embodiment of the present invention.

FIG. 8 is a diagram illustrating a method for transmitting sounding reference signals from a user equipment through two antennas per transmission instant in accordance with the embodiment of the present invention.

Referring to FIG. 8, if the base station signals the value $N_{SRS}$ to 1, the user equipment transmits the sounding reference signals through two antennas per transmission instant. In this case, the user equipment uses one sounding reference signal parameter (for example, transmissionComb parameter or cyclic shift value) as the value signaled by the upper layer, and uses the other sounding reference signal parameter by changing the signaled value, whereby the two sounding reference signals can be identified from each other. For example, if the value transmissionComb signaled by the upper layer is 0, the value transmissionComb of the sounding reference signal transmitted to the first antenna is set to 0, and the value transmissionComb of the sounding reference signal transmitted to the second antenna is changed to 1, whereby the base station can identify the two sounding reference signals from each other.

As another example, if the cyclic shift value signaled by the upper layer is 0, the cyclic shift value of the sounding reference signal transmitted to the first antenna is set to 0, and the cyclic shift value of the sounding reference signal transmitted to the second antenna is changed to 4, whereby the base station can identify the two sounding reference signals from each other. However, the changed cyclic shift value should be determined considering correlation property of a frequency selective channel.

Also, if the user equipment transmits the sounding reference signals through the first antenna and the second antenna at the kth transmission instant, it is preferable that the user equipment transmits the sounding reference signals through the third antenna and the fourth antenna at the k+1th transmission instant. Accordingly, as the transmission instant of two times passes, transmission of the sounding reference signals can be completed through all the antennas.

Figure 9:
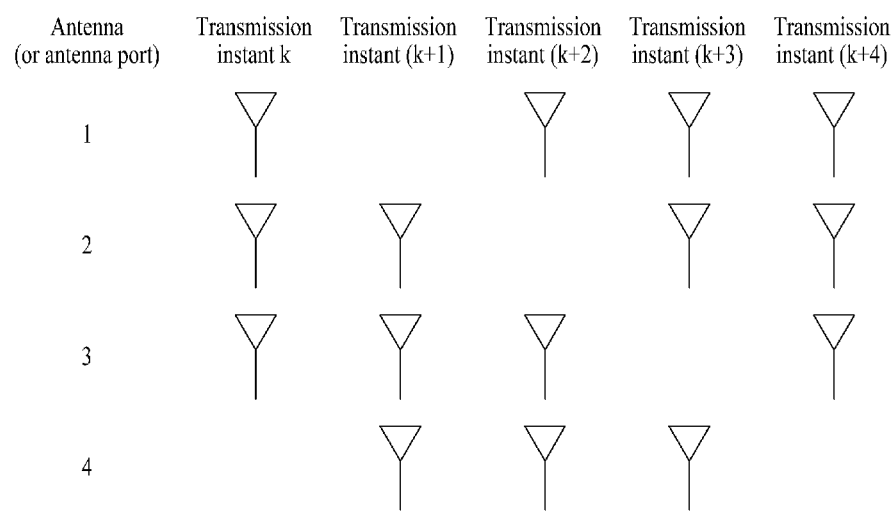
FIG. 9 is a diagram illustrating a method for transmitting sounding reference signals from a user equipment through three antennas per transmission instant in accordance with the embodiment of the present invention.

FIG. 9 is a diagram illustrating a method for transmitting sounding reference signals from a user equipment through three antennas per transmission instant in accordance with the embodiment of the present invention.

Referring to FIG. 9, if the base station signals the value $N_{SRS}$ to 2, the user equipment transmits the sounding reference signals through three antennas per transmission instant. In this case, the user equipment uses one sounding reference signal parameter (for example, transmissionComb parameter or cyclic shift value) as the value signaled by the upper layer, and uses the other two sounding reference signal parameters by changing the signaled value, whereby the three sounding reference signals can be identified from one another. When the other two sounding reference signal parameters are changed, one sounding reference signal parameter is used by changing the value transmissionComb and the other sounding reference signal parameter is used by changing the cyclic shift value. Also, the cyclic shift values of the three sounding reference signals may respectively be set to different values.

Also, if the user equipment transmits the sounding reference signals through the first antenna, the second antenna and the third antenna at the kth transmission instant, it is preferable that the user equipment transmits the sounding reference signals through the second antenna, the third antenna and the fourth antenna at the k+1th transmission instant. Accordingly, as the transmission instant of two times passes, transmission of the sounding reference signals can be completed through all the antennas.

Figure 10:
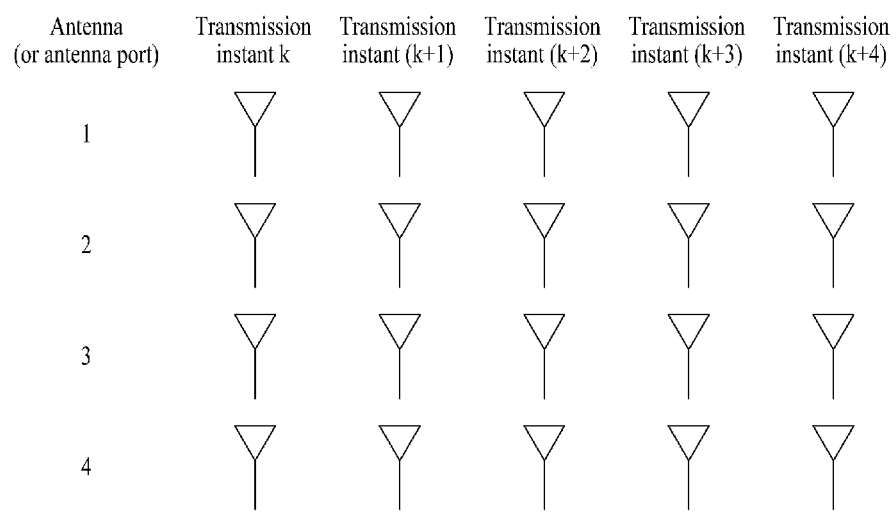
FIG. 10 is a diagram illustrating a method for transmitting sounding reference signals from a user equipment through four antennas per transmission instant in accordance with the embodiment of the present invention.

FIG. 10 is a diagram illustrating a method for transmitting sounding reference signals from a user equipment through four antennas per transmission instant in accordance with the embodiment of the present invention.

Referring to FIG. 10, if the base station signals the value $N_{SRS}$ to 3, the user equipment transmits the sounding reference signals through four antennas per transmission instant. In this case, the user equipment uses one sounding reference signal parameter (for example, transmissionComb parameter or cyclic shift value) as the value signaled by the upper layer, and uses the other three sounding reference signal parameters by changing the signaled value, whereby the four sounding reference signals can be identified from one another.

When the other three sounding reference signal parameters are changed, one sounding reference signal parameter is used by changing the value transmissionComb and the other two sounding reference signal parameters are used by using the value transmissionComb as it is but changing their cyclic shift values to different values. Also, the cyclic shift values of the four sounding reference signals may respectively be set to different values.

Figure 11:
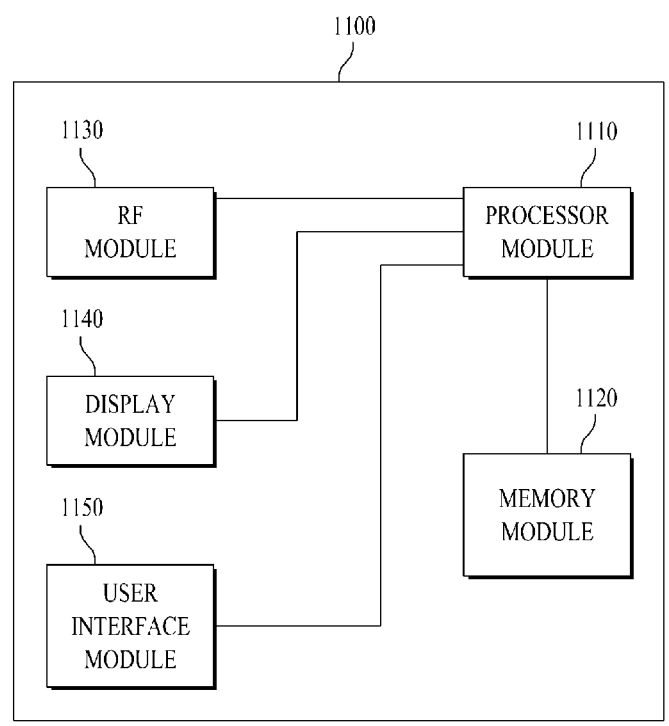
FIG. 11 is a block diagram illustrating a user equipment according to the embodiment of the present invention.

FIG. 11 is a block diagram illustrating a user equipment according to the embodiment of the present invention.

Referring to FIG. 11, the user equipment 1100 includes a processing module 1110, a memory 1120, a radio frequency (RF) module 1130, a display module 1140, and a user interface module 1150.

The user equipment 1100 is illustrated for convenience of description, and some modules of the user equipment 1100 may be omitted. Also, the user equipment 1100 may further include required modules. Furthermore, some modules of the user equipment 1100 may be divided into segmented modules. The processing module 1110 is configured to perform the operation according to the embodiment of the present invention, which is illustrated with reference to the accompanying drawings.

In detail, the processing module 1110 can perform a required operation to multiplex a control signal and a data signal. For the detailed operation of the processing module 1110, refer to the description of FIG. 1 to FIG. 9.

The memory 1120 is connected with the processing module 1110 and stores an operating system, an application, a program code, data, etc. therein. The RF module 1130 is connected with the processing module 1110 and converts a baseband signal to a radio signal or vice versa. To this end, the RF module 1130 performs analog conversion, amplification, filtering, frequency unlink conversion or their reverse procedures. The display module 1140 is connected with the processing module 1110, and displays various kinds of information. Examples of the display module 1140 include, but not limited to, LCD (Liquid Crystal Display), LED (Light Emitting Diode), and OLED (Organic Light Emitting Diode). The user interface module 1150 is connected with the processing module 1110, and can be configured by combination of well known user interfaces such as key pad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory and then may be driven by a processor. The memory may be located inside or outside the processor to transmit and receive data to and from the processor through various means which are well known.

As described above, the method for transmitting a sounding reference signal in a MIMO wireless communication system and the apparatus therefor have been described based on the 3GPP LTE system, but can be applied to various MIMO wireless communication systems.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting sounding reference signals (SRSs) using a plurality of antenna by a user equipment in a MIMO wireless communication system, the method comprising:
   receiving sounding reference signal parameters from a base station, wherein the sounding reference signal parameters include an initial cyclic shift value $n^{CS}_{SRS}$, and an initial transmissionComb parameter value $k_{tc}$;
   configuring a cyclic shift value for each of the antenna ports based on the number of antenna ports;
   configuring a transmissionComb parameter value for each of the antenna ports based on the initial transmissionComb parameter value $k_{tc}$, when the number of antenna ports is four; and
   transmitting the sounding reference signals simultaneously to the base station at a specific transmission time interval.

2. The method of claim 1, wherein the cyclic shift value is configured differently for each of the antenna ports.

3. The method of claim 1, wherein the transmissionComb parameter value for each of the antenna ports is 0 or 1.

4. The method of claim 1, further comprising:
   receiving information on the number of antennas from the base station.

5. A user equipment having multiple antennas, the user equipment comprising:
   a radio frequency unit (RF unit); and
   a processor,
   wherein the RF unit is configured to receive sounding reference signal parameters from a base station, wherein the sounding reference signal parameters include an initial cyclic shift value $n^{CS}_{SRS}$, and an initial transmissionComb parameter value $k_{tc}$; and
   wherein the processor is configured to set a cyclic shift value for each of the antenna ports based on the number of antenna ports, and to set a transmissionComb parameter value for each of the antenna ports based on the initial transmissionComb parameter value $k_{tc}$ when the number of antenna ports is four; and
   wherein the RF unit is further configured to transmit the sounding reference signals simultaneously to the base station at a specific transmission time interval.

6. The user equipment of claim 5, wherein the cyclic shift value is configured differently for each of the antenna ports.

7. The user equipment of claim 5, wherein the transmissionComb parameter value for each of the antenna ports is 0 or 1.

8. The user equipment of claim 5, wherein the RF unit is further configured to receive information on the number of antennas from the base station.

* * * * *